US008812264B2

(12) United States Patent
Runkle (10) Patent No.: US 8,812,264 B2
(45) Date of Patent: Aug. 19, 2014

(54) USE OF WATTMETER TO DETERMINE HYDRAULIC FLUID PARAMETERS

(75) Inventor: Mark Andrew Runkle, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 276 days.

(21) Appl. No.: 13/069,902

(22) Filed: Mar. 23, 2011

(65) Prior Publication Data

US 2012/0245894 A1 Sep. 27, 2012

(51) Int. Cl.
*G06F 19/00* (2011.01)

(52) U.S. Cl.
USPC .......................................... 702/183; 324/142

(58) Field of Classification Search
CPC ....................................................... G05B 23/02
USPC .......................................... 702/183; 324/142
See application file for complete search history.

(56) References Cited

U.S. PATENT DOCUMENTS

| | | | |
|---|---|---|---|
| 4,108,574 A | 8/1978 | Bartley et al. | |
| 4,278,403 A | 7/1981 | Shafer | |
| 5,318,409 A | 6/1994 | London et al. | |
| 5,353,646 A | 10/1994 | Kolpak | |
| 5,865,602 A | 2/1999 | Nozari | |
| 2002/0170349 A1 | 11/2002 | Soneda et al. | |
| 2004/0064292 A1 | 4/2004 | Beck et al. | |
| 2005/0207898 A1* | 9/2005 | Lee | 417/28 |
| 2008/0256918 A1* | 10/2008 | Kubinski | 56/17.1 |
| 2009/0204245 A1* | 8/2009 | Sustaeta et al. | 700/99 |
| 2009/0260912 A1* | 10/2009 | Isogai | 180/336 |
| 2010/0156112 A1 | 6/2010 | Held et al. | |
| 2010/0189572 A1 | 7/2010 | Hansen | |
| 2010/0275565 A1 | 11/2010 | Moe et al. | |

FOREIGN PATENT DOCUMENTS

| | | |
|---|---|---|
| GB | 2313197 A | 11/1997 |
| WO | 03031918 A1 | 4/2003 |
| WO | 2005026922 A1 | 3/2005 |
| WO | 2005085772 A1 | 9/2005 |

OTHER PUBLICATIONS

GE Multilin, "469 Motor Management Relay Instruction Manual", Copyright 2008 GE Multilin, 248 pages, 469 Firmware Revision 30E29x.000, 469 PC Software Revision 2.9x, Manual P/N: 1601-0057-DH (GEK-106289J), Canada.
GE Multilin, "469 Motor Management Relay Instruction Manual", Copyright 2009 GE Multilin, 338 pages, Software Revision 5.0x, Manual P/N: 1601-0122-A8 (GEK-106474G), http://www.gedigitalenergy.com/products/manuals/469/469man-a8.pdf on Mar. 30, 2010, Canada.

(Continued)

*Primary Examiner* — John Breene
*Assistant Examiner* — Haihui Zhang
(74) *Attorney, Agent, or Firm* — Dale J. Davis; Hoffman Warnick LLC (57) ABSTRACT

Disclosed herein is an approach that uses a wattmeter to determine hydraulic fluid parameters. In one aspect, a controller uses the electric power measured by the wattmeter to determine the power delivered to hydraulic fluid delivered by a hydraulic pump unit to a hydraulic fluid consuming device and the volumetric flow rate of the hydraulic fluid delivered to the hydraulic fluid consuming device by the hydraulic pump unit.

18 Claims, 9 Drawing Sheets

(56) References Cited

OTHER PUBLICATIONS

GE Digital Energy Protection & Control, "469 Motor Protection System Complete Integration Protection and Management of Medium and Large Motors," 2010 General Electric Company, 8 pages, retrieved from: http://www.gedigitalenergy.com/multilin/catalog/469.htm on Feb. 9, 2011.

Zollinger, Office Action Communication for U.S. Appl. No. 13/117,290 dated May 22, 2014, 25 pages.

European Patent Office, European Search Report for Application No. 12160038.1 dated Jun. 2, 2014, 9 pages.

* cited by examiner

USE OF WATTMETER TO DETERMINE HYDRAULIC FLUID PARAMETERS

BACKGROUND OF THE INVENTION

The present invention relates generally to hydraulic systems, and more particularly to using a wattmeter in conjunction with a hydraulic pump unit to obtain electric power measurements for use by a controller to determine hydraulic fluid parameters.

Hydraulic systems such as hydraulic pump units are used in a wide range of applications. Fluid power supplies for hydraulic rams, hydraulically actuated valves and lift oil systems are a few examples in which hydraulic pump units are deployed. A typical hydraulic pump unit includes a motor driven pump that supplies pressurized hydraulic fluid from a tank to actuators via a control valve. Because a typical hydraulic pump unit can transmit high forces of highly pressurized hydraulic fluid it is difficult to obtain accurate flow rate readings. Without accurate flow rate readings, the ability for determining hydraulic fluid parameters and performing diagnostics on these hydraulic pump units is impaired.

BRIEF DESCRIPTION OF THE INVENTION

In one aspect of the present invention, a system is provided. The system comprises a hydraulic fluid consuming device; a hydraulic pump unit that provides hydraulic fluid to the hydraulic fluid consuming device; a wattmeter that measures the electric power consumption by the hydraulic pump unit; and a controller that uses the electric power measured by the wattmeter to determine power delivered to the hydraulic fluid by the hydraulic pump unit and volumetric flow rate of the hydraulic fluid delivered to the hydraulic fluid consuming device by the hydraulic pump unit.

In another aspect of the present invention, a hydraulic system is provided. The hydraulic system comprises at least one hydraulic fluid consuming device; an electric motor; a pump unit driven by the electric motor that provides hydraulic fluid to the at least one hydraulic fluid consuming device; a valve that controls supply of the hydraulic fluid by the pump unit to the at least one hydraulic fluid consuming device; a wattmeter that measures the electric power consumption by the electric motor as the pump unit provides the hydraulic fluid to the at least one hydraulic fluid consuming device; and a controller that determines power delivered to the hydraulic fluid by the pump unit and volumetric flow rate of the hydraulic fluid delivered to the at least one hydraulic fluid consuming device by the pump unit as a function of the electric power measured by the wattmeter.

DETAILED DESCRIPTION OF THE INVENTION

Various embodiments of the present invention are directed to using a wattmeter in conjunction with a hydraulic pump unit to obtain electric power measurements for a hydraulic system. The electric power measurements are used by a controller to determine hydraulic fluid parameters for the hydraulic system. These hydraulic fluid parameters can be used to obtain diagnostics on the hydraulic pump unit and a hydraulic fluid consuming device connected to the pump unit during steady state operation. Examples of hydraulic fluid parameters that may be determined from the wattmeter's electric power measurements include the power delivered to the hydraulic fluid by the hydraulic pump unit and volumetric flow rate of the hydraulic fluid delivered to the hydraulic fluid consuming device. Examples of diagnostics that may be obtained from the hydraulic fluid parameters include determining when a flow of hydraulic fluid was demanded by the hydraulic fluid consuming device, determining an amount of time that the flow of hydraulic fluid was demanded by the hydraulic fluid consuming device, determining an amount of hydraulic fluid that was supplied by the hydraulic pump unit to the hydraulic fluid consuming device, a plot of power and energy versus time and slew rate of the hydraulic fluid consuming device.

Technical effects of the various embodiments of the present invention include improved diagnostics of a hydraulic pump unit and a hydraulic fluid consuming device. Such diagnostics can be facilitated remotely via a computing system (e.g., a host controller) located at a distance from the hydraulic pump unit and the hydraulic fluid consuming device, or the diagnostics can be facilitated by a portable human interface machine device operated by a plant operator located in proximity to the pump unit and fluid consuming device. Improved diagnostics reduce troubleshooting time and increase the availability of the hydraulic pump unit and the hydraulic fluid consuming device for operation in performing prescribed process operations.

Figure 1:
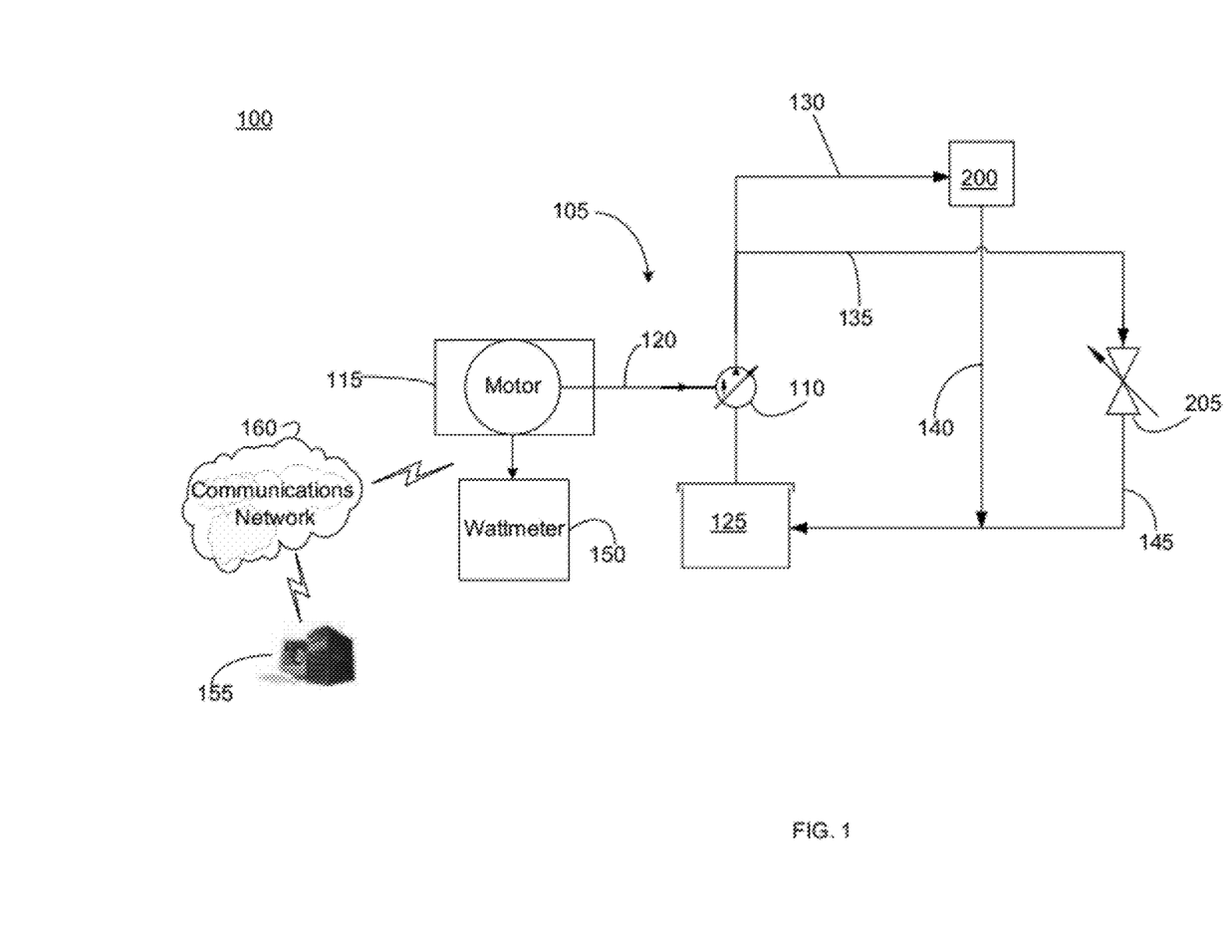
FIG. 1 is a schematic diagram illustrating a hydraulic system according to one embodiment of the present invention.

Referring to the drawings, FIG. 1 is a schematic diagram illustrating a hydraulic system 100 according to one embodiment of the present invention. Hydraulic system 100 includes a hydraulic pump unit 105 that includes a pump unit 110 driven by an electric motor 115 along load coupling 120. A tank 125 contains hydraulic fluid that pump unit 105 extracts and delivers to a hydraulic fluid consuming device 200 and/or to a hydraulic fluid consuming device 205 (represented as a valve in FIG. 1) as pressurized fluid along lines 130 and 135, respectively. As used herein, hydraulic fluid consuming device 200 is representative of a device that can be controlled by a process controller or a device that can inform the controller that it is consuming hydraulic fluid. The former may be a hydraulic valve controller that opens larger valves by filling hydraulic rams that position valve stems of the large valves. The latter is typically a limit switch on manual valves or a linear variable displacement transformer (LVDT) on an automatic two-way valve that operates hydraulic rams for machines. As used herein, hydraulic fluid consuming device 205 is representative of a device that is not actively controlled by a process controller. However, this does not mean that these hydraulic fluid consuming devices are fixed with time. In one embodiment, hydraulic fluid consuming device 205 may represent laminar flow leakage through actuators, high-pressure packing seals or inadvertent piping leaks.

The hydraulic fluid returns from hydraulic fluid consuming device 200 and/or hydraulic fluid consuming device 205 to tank 125 after use thereof via lines 140 and 145, respectively. For the sake of explaining the various embodiments associated with the present invention, the following description pertains to the delivery of pressurized hydraulic fluid to and from hydraulic fluid consuming device 200.

In one embodiment, hydraulic pump unit 110 may be a swash plate pump having a rotating cylinder containing pistons, where a spring pushes the pistons against a stationary swash plate that sits at an angle to the cylinder. In operation, the pistons suck in fluid during half a revolution and push fluid out during the other half. In one embodiment, as illustrated in FIG. 1, pump unit 105 may be a swash plate pump that is of the variable displacement, self-pressure regulated type. A swash plate pump that is of the variable displacement, self-pressure regulated type has a control arm that controls the angle of the swash plate and thus, operation of the pistons according to a specified pressure set point. The maximum angle setting of the swash plate determines the maximum fluid that can be pumped in one revolution of the pump. The maximum flow rate is thus determined by the maximum angle and the revolutions per minute of the pump as driven by the motor.

In one embodiment, electric motor 115 may be an industrial motor that can take the form of an induction motor such as an alternating current (AC) electric motor. For example, electric motor 115 may be a single-phase motor or a three-phase motor. Electric motor 115 drives the pump unit 110 to a sufficient pressure that facilitates extraction of the hydraulic fluid from tank 125 and delivery to hydraulic fluid consuming device 200 along line 130. As an example, typical pressures for delivery to hydraulic fluid consuming device 200 may be in the range of about 1600 pound-force per square inch gauge (psig) to about 2400 psig for valve control supplies used with a turbine and about 3300 psig for a bearing lift oil system.

During operation of hydraulic pump unit 105 with hydraulic fluid consuming device 200, a wattmeter 150 measures the electric power consumed by electric motor 115 as pump unit 110 provides the pressurized hydraulic fluid to hydraulic fluid consuming device 200 along line 130. In one embodiment, wattmeter 150 transmits the electric power measurements to a controller 155 via a communications network 160. As explained below in more detail, controller 155 may use the electric power measurements from wattmeter 150 to determine the power delivered to the hydraulic fluid by pump unit 110 and the volumetric flow rate of the hydraulic fluid delivered to hydraulic fluid consuming device 200 by the pump. In addition, as explained below in more detail, controller 155 may determine diagnostics for hydraulic fluid consuming device 200, electric motor 115 and pump unit 105 during a steady-state operation from the power delivered to the hydraulic fluid and the volumetric flow rate of the hydraulic fluid.

In one embodiment, wattmeter 150 may be a stand-alone device or it may be integrated within a modern smart motor controller such as a motor protection system (e.g., motor relays, meters, motor control centers, etc.) that is used to protect industrial motors from failing. As is well-known in the art, these motor protection systems generally provide protection against conditions including: unbalanced loads, excessively high overcurrent faults, undervoltage conditions, overvoltage conditions, mechanical jams and load losses. In addition, these motor protection systems can obtain data measurements such as current, voltage, frequency, power and var and transmit them to controller 155 via communications network 160. One example of a commercially available motor protection device that may be integrated with wattmeter 150 is a 469 Motor Management Relay sold by GE Multilin. Those skilled in the art will recognize that there are other commercially available motor protection devices that perform functions and generate information similar to the 469 Motor Management Relay that can be utilized in the embodiments described herein.

In one embodiment, controller 155 may be integrated within a host controller (e.g., host computing system) located at a distance from hydraulic pump unit 105 and hydraulic fluid consuming device 200. In another embodiment, controller 155 may be embedded within a portable human interface machine device that can be used by a plant operator located in proximity to hydraulic pump unit 105 and hydraulic fluid consuming device 200. Regardless of the implementation, controller 155 is able to communicate with all of the elements (i.e., pump unit 110, electric motor 115, tank 125, hydraulic fluid consuming devices 200 and 205, and wattmeter 150) illustrated in FIG. 1 via communications network 160.

Those skilled in the art will recognize that system 100 is only a schematic and that additional elements may exist, however, for the sake of simplicity in illustrating the various embodiments of the present invention these elements are not illustrated in FIG. 1. For example, those skilled in the art will recognize that hydraulic pump unit 105 may have other elements such as a filters to protect sliding parts from friction and pressure control orifices from blockage, control valves to control the flow of the pressurized hydraulic fluid, manifolds to facilitate delivery of the fluid, accumulators, sensors and transducers (e.g., current sensors, voltage sensors, temperature sensors), etc. Furthermore, those skilled in the art will recognize that the elements in system 100 may have more components than the amount illustrated in FIG. 1. For example, there may be more than one motor/pump tank set (e.g., a lead prime mover and a lag prime mover) and accompanying wattmeter to deliver the hydraulic fluid. Furthermore, there may be a multiple of hydraulic fluid consuming devices (e.g., see FIG. 2) that receive the pressurized hydraulic fluid.

Figure 2:
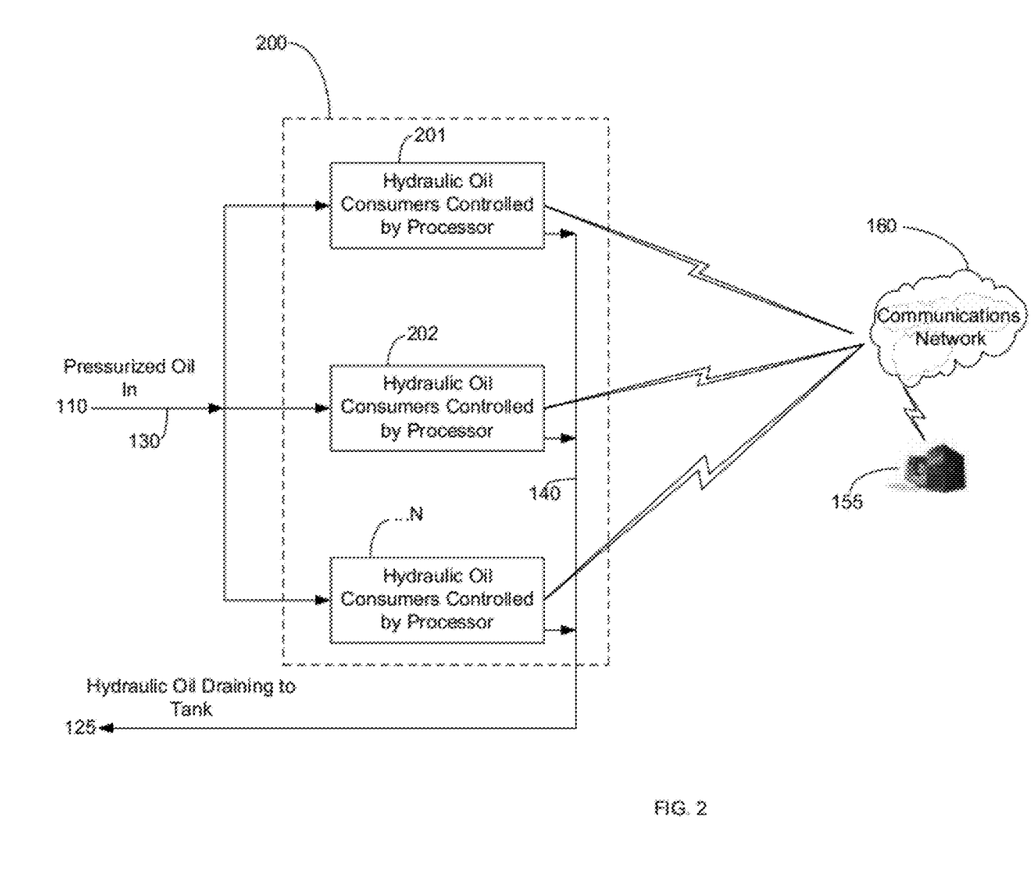
FIG. 2 is a more detailed view of a multitude of hydraulic fluid consuming devices in communication with a controller depicted in FIG. 1 according to one embodiment of the present invention.

FIG. 2 is a more detailed view of a plurality of hydraulic fluid consuming devices in communication with controller 155 via communications network 160. As shown in FIG. 2, hydraulic fluid consuming device 200 which is depicted in FIG. 1 as one element, includes N hydraulic fluid consuming devices (i.e., 201, 202, . . . N). As mentioned above, hydraulic fluid consuming device 200 can be a device that is controlled by a process controller or a device that can inform the controller that it is consuming hydraulic fluid. In the embodiment described with respect to FIGS. 2-3, hydraulic fluid consuming devices 200 are positioning actuators for control valves. As explained below with respect to FIG. 3, these positioning actuators use high-pressure oil (i.e., the pressurized hydraulic fluid) extracted from tank 125 by pump unit 110 to fill a right-circular hydraulic cylinder containing an actuator rod. This rod drives the stem of a valve to open and close it for control of a process fluid. These positioning actuators for control valves have a wide range of uses. Non-limiting examples of uses of these positioning actuators include on construction equipment, cranes and countless other manufacturing uses. Regardless of the application, the end use of the pressurized hydraulic fluid is to move a ram by displacing it with a volume of the fluid.

As shown in FIG. 2, hydraulic fluid consuming devices 200 can communicate with controller 155 via communications network 160 because they are the type of fluid consuming device that is either controlled by the controller or the type that is able to communicate with the controller to inform it of its consumption of hydraulic fluid. In one embodiment, controller 155 assigns a variable to each hydraulic fluid consuming devices 200 that is indicative of whether the actuator is or is not consuming oil. As used herein, the assigned variable is referred to as a control valve moving (CVM) variable. For the scenario in which controller 155 controls how hydraulic fluid consuming devices 200 consume the hydraulic fluid, the CVM can have a value of 0 or 1. A CVM having a value that is equal to 0 is indicative of an instance where controller 155 commands a hydraulic fluid consuming device to not consume hydraulic fluid, whereas a CVM having a value that is equal to 1 is indicative of an instance where controller 155 commands a fluid consuming device to consume the fluid to move the actuator rod. Applying this nomenclature to FIG. 2, each hydraulic fluid consuming device (actuator) i, where i equals 1, 2, ... N, is assigned a variable $CVM_i$ provided by controller 155, that is equal to 0 or 1 depending upon whether or not the controller has ordered the fluid consuming device to consume the hydraulic fluid.

Figure 3:
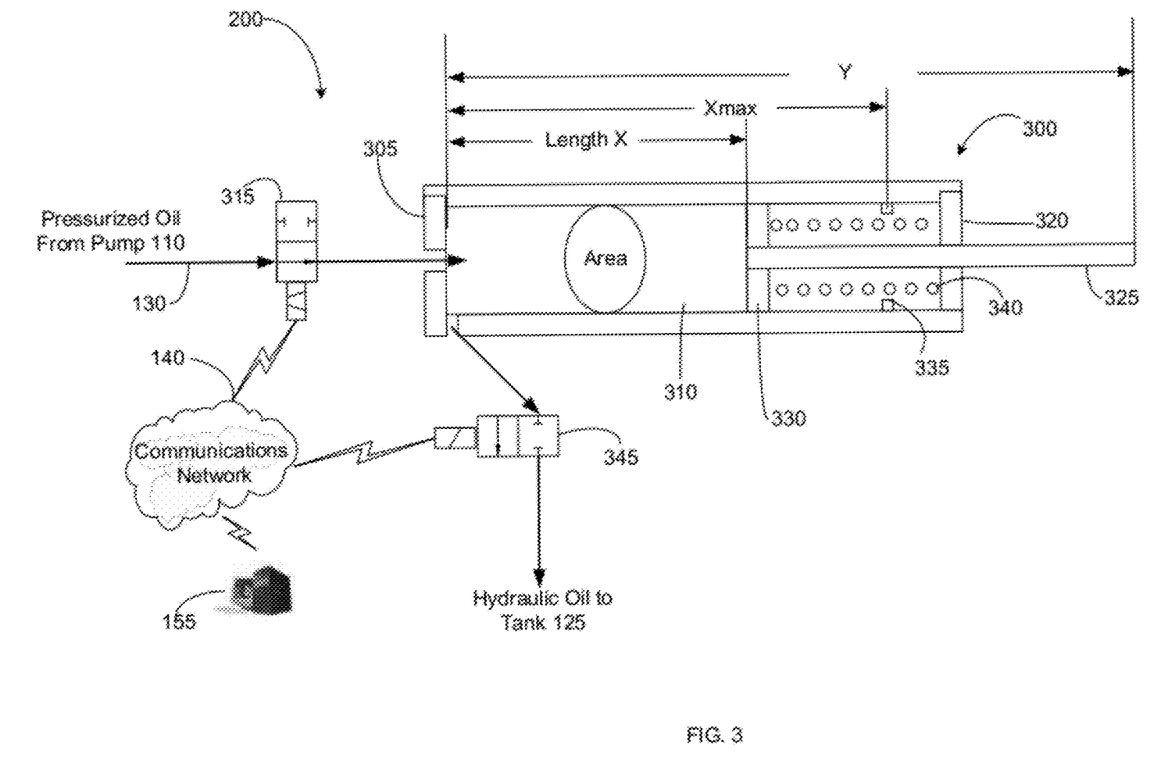
FIG. 3 is a more detailed view of one of the hydraulic fluid consuming devices depicted in FIG. 2 according to one embodiment of the present invention.

FIG. 3 is a more detailed view of one of the hydraulic fluid consuming devices (actuator) 200 depicted in FIG. 2 according to one embodiment of the present invention. As shown in FIG. 3, hydraulic fluid consuming device 200 includes a hydraulic cylinder 300 having a cylinder bottom opening 305 in which the pressurized hydraulic fluid delivered from pump unit 110 can enter a chamber 310 of the cylinder via a control valve 315. Hydraulic cylinder 300 further includes a cylinder head 320 through which a rod 325 having a ram 330 is configured to move within chamber 310 as a function of the displacement of the fluid. In particular, the hydraulic fluid enters cylinder bottom opening 305 in response to control valve 315 permitting the flow of the fluid. Eventually, the hydraulic fluid pressures ram 330 toward cylinder head 320. As shown in FIG. 3, the hydraulic fluid fills an amount in chamber 310 that corresponds to a length X. A limit ring 335 sets the maximum extent of the ram's movement to the right and the maximum length Xmax of hydraulic fluid that can be contained in chamber 310. The position of the rod 325 is represented in FIG. 3 by length Y.

FIG. 3 further shows that hydraulic cylinder 300 further includes a return spring 340 which will drive X to have a length of zero when valve 345 is opened to permit the hydraulic fluid within chamber 310 to empty and return to tank 125. Given this configuration of hydraulic cylinder 300, the volume of the displaced hydraulic fluid is related to the length of ram movement and can be represented by the relationship of:

$$\text{Delta Volume} = \text{Area} \times \text{Length, wherein} \tag{1}$$

Area is the internal area of the hydraulic cylinder 300 and Length is the length that ram 330 is displaced by the fluid.

Based on whether hydraulic cylinder 300 is consuming hydraulic fluid (i.e., using fluid to move ram 330 within chamber 310) or not consuming fluid (i.e., emptying the fluid from chamber 310 into tank 125), controller 155 will assign a CVM variable value of 0 or 1 to valves 315 and 345. In the example illustrated in FIG. 3, since valve 315 is permitting the flow of hydraulic fluid into cylinder bottom opening 305 and valve 345 is closed to prevent the return of the fluid to tank 125, controller 155 assigns a CVM value of 1 to valve 315 and a CVM value of 0 to valve 345.

Referring back to FIG. 1, as pump unit 110 delivers the pressurized hydraulic fluid to hydraulic fluid consuming device 200, wattmeter 150 is measuring the electric power consumed by electric motor 115 and transmitting this information to controller 155 via communications network 160. Controller 155 uses the electric power measurements from wattmeter 150 to determine the power delivered to the hydraulic fluid by pump unit 110 and the volumetric flow rate of the hydraulic fluid delivered to hydraulic fluid consuming device 200. The determinations of these hydraulic fluid parameters is based on the following equation which describes the relationship for power delivered by a pump to a hydraulic fluid:

$$P\text{fluid} = 0.435 \times P\text{reg} \times Q, \text{wherein} \tag{2}$$

Pfluid is the power delivered to the fluid in watts, 0.435 is the conversion factor from psig*gallons/minute to watts, Preg is the regulated pressure across the pump in psig and Q is the volumetric flow rate in gallons per minute (GPM). For the various embodiments of the present invention, it is assumed herein that Preg is constant. As a result, Pfluid, the power delivered to the fluid is proportional to Q, the volumetric flow rate.

In order to determine the power delivered to the fluid (Pfluid), controller 155 may utilize efficiency curves associated with electric motor 115 and pump unit 110. Those skilled in the art will appreciate that the efficiency curves associated with electric motors and pump unit are typically provided in the documentation provided by the vendors of these items. Note that pump efficiency is typically assumed to be the constant volumetric efficiency of the pump. In the embodiments of the present invention, efficiency curves associated with electric motor 115 and pump unit 110 may be electronically stored (e.g., in a look-up table) and retrieved by controller 155. As a result of having access to the efficiency curves associated with electric motor 115 and pump unit 110, controller 155 is able determine mechanical power from the electric power measurements provided by wattmeter 150 and fluid power (Pfluid) from mechanical power. Controller 155 can then determine the volumetric flow rate (Q) from the fluid power (Pfluid). The above determinations are represented by the following equations:

$$P\text{mech} = P\text{elec} \times \eta_m(P\text{elec}), \text{wherein} \tag{3}$$

Pmech is the estimated mechanical power in watts, Pelec is the motor power reading from the wattmeter in watts, and $\eta_m$ is the motor efficiency as a decimal, and $$P\text{fluid} = P\text{mech} \times \eta_p, \text{wherein} \tag{4}$$

$\eta_p$ is the pump volumetric efficiency.

Using basic algebra with equation 2, equation 3 and equation 4 results in the following relationship:

$$Q = P\text{elec} \times \eta_m(P\text{elec}) \times \eta_p / (0.435 \times P\text{reg}) \tag{5}$$

As result, a simple linear, proportional relationship now exists between measured electric power from wattmeter 150 and volumetric flow rate of the hydraulic fluid delivered to hydraulic fluid consuming device 200.

Figure 4:
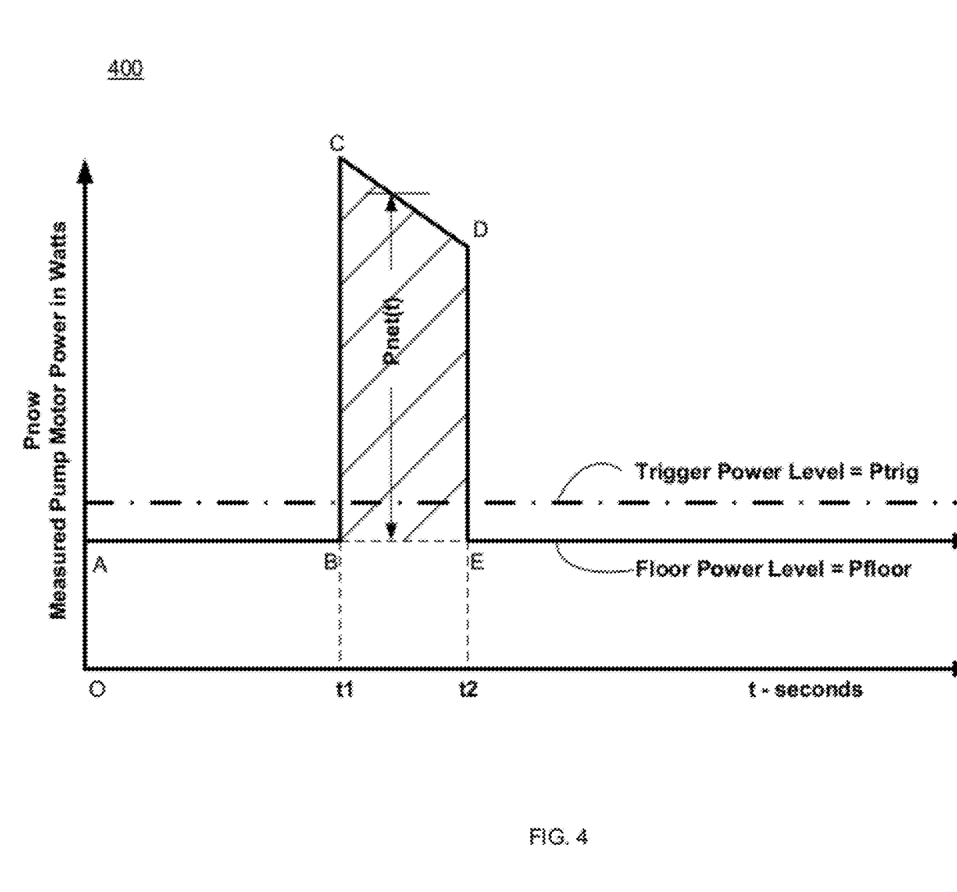
FIG. 4. is a graph illustrating the determination of the volumetric flow rate of hydraulic fluid delivered to a hydraulic fluid consuming device from an instantaneous power measurement according to one embodiment of the present invention.

With equations 1-5, controller 155 is able to ascertain the power delivered to the hydraulic fluid by pump unit 110 and the volumetric flow rate of the hydraulic fluid delivered to hydraulic fluid consuming device 200 from power measurements obtained by wattmeter 150. FIG. 4 illustrates the timing of the power measurements with respect to certain events experienced by hydraulic fluid consuming device 200 that are indicative of states when the device is consuming fluid and states when the device is not consuming fluid. In particular, FIG. 4. is a graph 400 showing a typical power curve versus time for power measurements obtained from wattmeter 150 as hydraulic fluid consuming device 200 is consuming fluid and not consuming fluid. As shown in FIG. 4, the y-axis represents the instantaneous power readings, Pnow, in watts generated from wattmeter 150 and the x-axis represents the time in seconds. The floor power level, Pfloor, represents the flow level where the power draw from pump unit 110 is at a minimum. When the instantaneous power reading, Pnow, is at the floor power level, Pfloor, then this is an indication that hydraulic fluid consuming device 200 is not consuming fluid. As a result, controller 155 assigns hydraulic fluid consuming device 200 a CVM variable value of 0. Those skilled in the art will appreciate that there are various statistical methods of establishing a floor reading for Pfloor. One example of establishing a floor reading for Pfloor is by taking the average value of the power measurements over a period of time that all of the CVMi variables are equal to 0.

A trigger power level, Ptrig, is also shown in graph 400 of FIG. 4. The trigger power level, Ptrig, defines the minimum power draw greater than Pfloor that is representative of the occurrence of an event (i.e., the hydraulic fluid consuming device 200 is starting to consume fluid). The trigger power level, Ptrig, may be manually set by an operator, or statistically established by using a statistical deviation from Pfloor (e.g., +3 standard deviations of the floor reading). Whichever approach is used, a trigger power level, Ptrig, should be set that is distinctive from any level that is representative of general noise that can arise in system 100.

As shown in FIG. 4, an event (e.g., a valve for a hydraulic fluid consuming device opens up) occurs at time t1 because the Pnow reading jumps from a steady level of A to B at Pfloor to above the Ptrig level and subsequently to level C. This is an indication that pump unit 105 is doing work on the hydraulic fluid because a valve or hydraulic fluid consuming device 200 is permitting fluid to flow. The fluid consuming event ends at time t2 because controller 155 has determined that hydraulic fluid consuming device 200 has consumed a sufficient amount of fluid (i.e., the ram and rod of the hydraulic cylinder are at a properly positioned location). As shown in FIG. 4, Pnow drops from level C to level D as the event is about to end, and then past Ptrig to level E, which is at Pfloor once the event has ended.

It is during this time between the initiation of an event at t1 and the end of an event at t2 that controller 155 is determining the power delivered to the hydraulic fluid by pump unit 105 and the volumetric flow rate of the hydraulic fluid delivered to hydraulic fluid consuming device 200 in accordance with the concepts embodied in equations 1-5. Graph 400 of FIG. 4 provides an indication of what area of the power measurements within the time frame between t1 and t2 that controller 155 is interested in using in its determination of power delivered to the hydraulic fluid and the volumetric flow rate. In particular, Pnet, which is the cross-hatched area in FIG. 4, is the region that controller 155 is interested in. Pnet is representative of the incremental power consumed and is equal to Pnow minus Pfloor. Those skilled in the art will recognize that the power level OA drawn by the leakage is of no interest when trying to estimate the hydraulic fluid drawn by opening a valve associated with hydraulic fluid consuming device 200. Furthermore, those skilled in the art will recognize that the total area t1-t2-E-D-C-B in graph captures both the leakage power OA and the incremental power Pnet(t)=Pnow−OA.

Assuming ceteris paribus (i.e., with all things (leakage, friction, windage) held equal it is believed that the power measurements from the wattmeter will be the same before the occurrence of time t1 and the same after the occurrence of time t2), the controller 155 is able to make the approximation of the cross-hatched area (the area enclosed by BCDE). This gives the ability to build a net Flow Rate from Pnet which is the difference of the real-time power, Pnow, and the floor power, Pfloor. As a result, the net flow rate is represented as:

$$\text{Flow Rate} = Q\text{now} - Q\text{floor, wherein} \tag{6}$$

Qnow is the flow rate at Pnow and Qfloor is flow rate when the pump is at Pfloor. Inserting Qnow and Qfloor into equation 5 results in:

$$Q\text{now} = P\text{now} * \eta_m(P\text{now}) * \eta_p/(0.435 * P\text{reg}) \tag{7}$$

$$Q\text{floor} = P\text{floor} * \eta_m(P\text{floor}) * \eta_p/(0.435 * P\text{reg}) \tag{8}$$

By substituting equations 7 and 8 into equation 6, the Flow rate can be represented as:

$$\text{Flow Rate} = [P\text{now} * \eta_m(P\text{now}) - P\text{floor} * \eta_m(P\text{floor})] * \eta_p/(0.435 \times P\text{reg}) \tag{9}$$

The net volume of fluid displaced by the pump from t1 to t2 is the area represented by region BCDE. The net volume of fluid is represented as:

$$V\text{net} = \text{Integral}(t1 \text{ to } t2)(\text{Flow Rate} * dt) \tag{10}$$

By substituting equation 9 for Flow Rate, Vnet can be represented as follows:

$$V\text{net} = \text{Integral}(t1 \text{ to } t2)(dt * (P\text{now} * \eta_m(P\text{now}) - P\text{floor} * \eta_m(P\text{floor})) * \eta_p/(0.435 \times P\text{reg}) \tag{11}$$

Therefore, it is apparent from equations 1-11 that net power is proportional to net flow. As a result, the energy bounded by the cross-hatched region BCDE is also the volume of hydraulic fluid displaced by pump unit 110 at a differential pressure of Preg. The energy expended on raising the volume of fluid Vnet through constant pressure Preg is equal to Preg×Vnet, or the energy, net of efficiencies.

In one embodiment, in order to maximize diagnostic capability, values for variables including: the initiation of event t1, the duration of the event, t2-t1, the maximum flow rate, the volume, Pfloor, Ptrig may be stored in memory or data storage of controller 155. The details of how controller 155 uses the aforementioned equations to determine power delivered to the hydraulic fluid by pump unit 110 and the volumetric flow rate of the hydraulic fluid delivered to hydraulic fluid consuming device 200 is explained below in more detail with respect to the flow chart of FIGS. 5A-5C.

With both the power delivered to the hydraulic fluid and the volumetric flow rate of the hydraulic fluid determined, controller 155 can use these parameters to ascertain various diagnostics for the hydraulic fluid consuming device and hydraulic pump unit 105 during a steady-state operation. Some diagnostics that controller 155 may determine include ascertaining when a flow of hydraulic fluid was demanded by hydraulic fluid consuming device 200, determining an amount of time that the flow of hydraulic fluid was demanded by the hydraulic fluid consuming device, determining an amount of hydraulic fluid that was supplied by hydraulic pump unit 105 to the fluid consuming device, a plot of power and energy versus time, and slew rate of the fluid consuming device (note that dx/dt and dy/dt are Q/area of ram 330 of hydraulic cylinder 300).

Figure 5A:
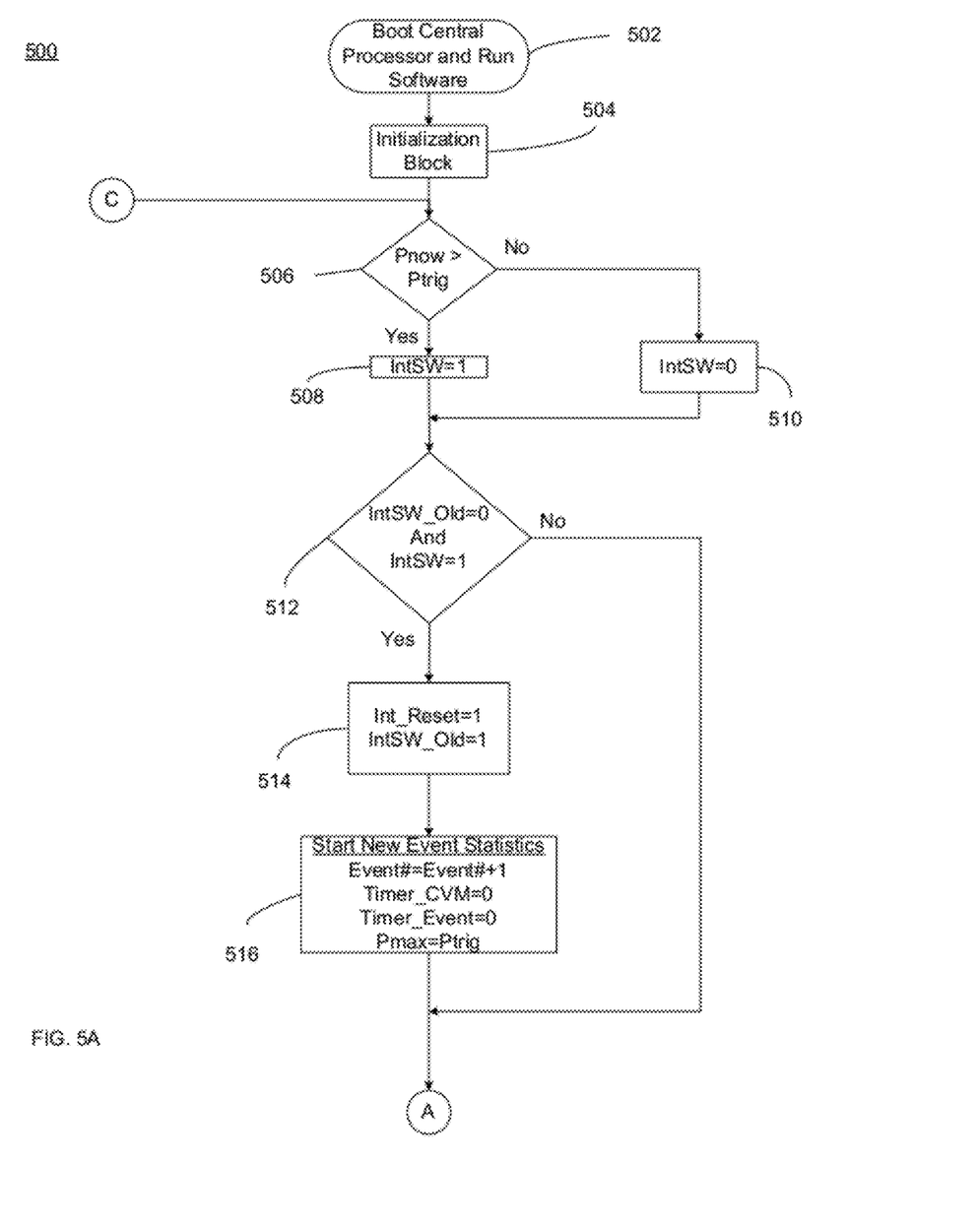
FIGS. 5A-5C illustrate a flow chart describing process operations associated with obtaining diagnostics for the hydraulic system depicted in FIG. 1 according to one embodiment of the present invention.
Figure 5B:
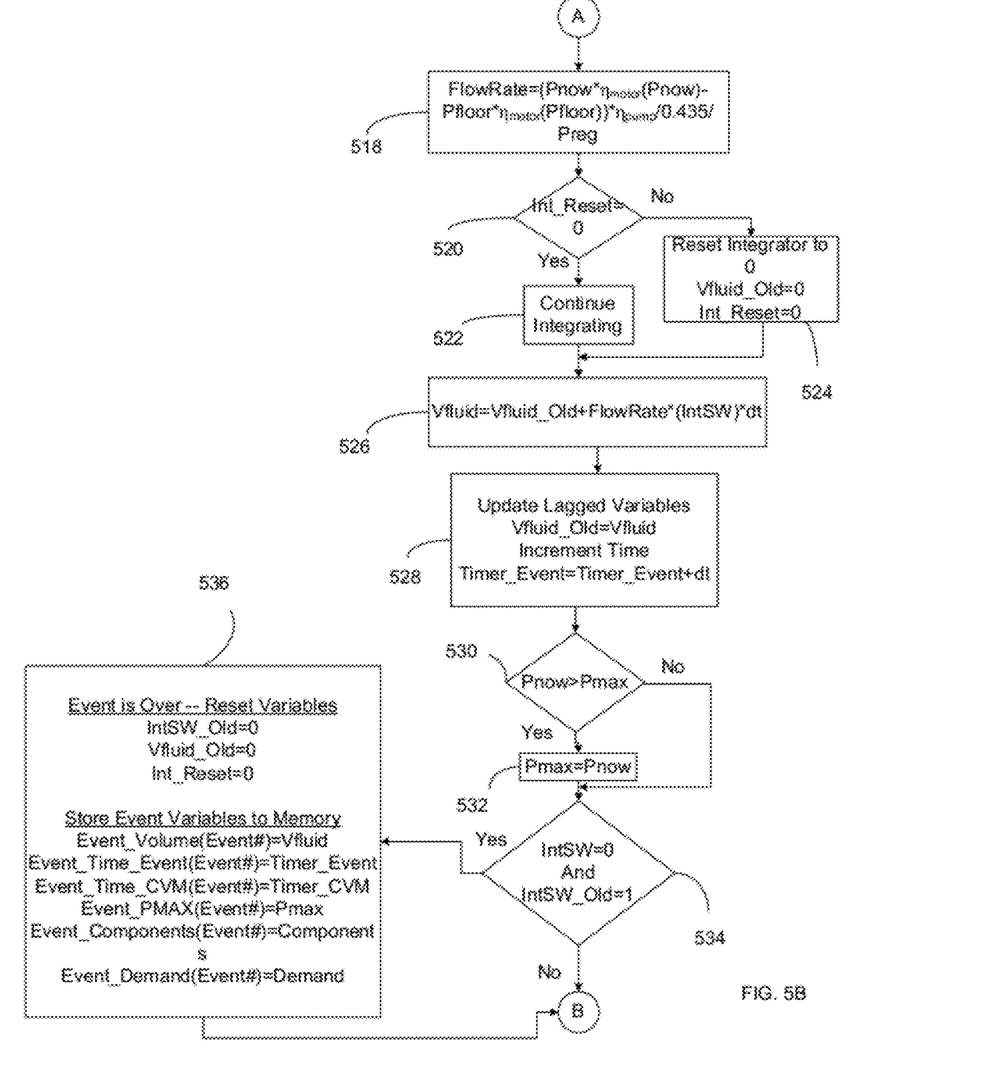
Figure 5C:
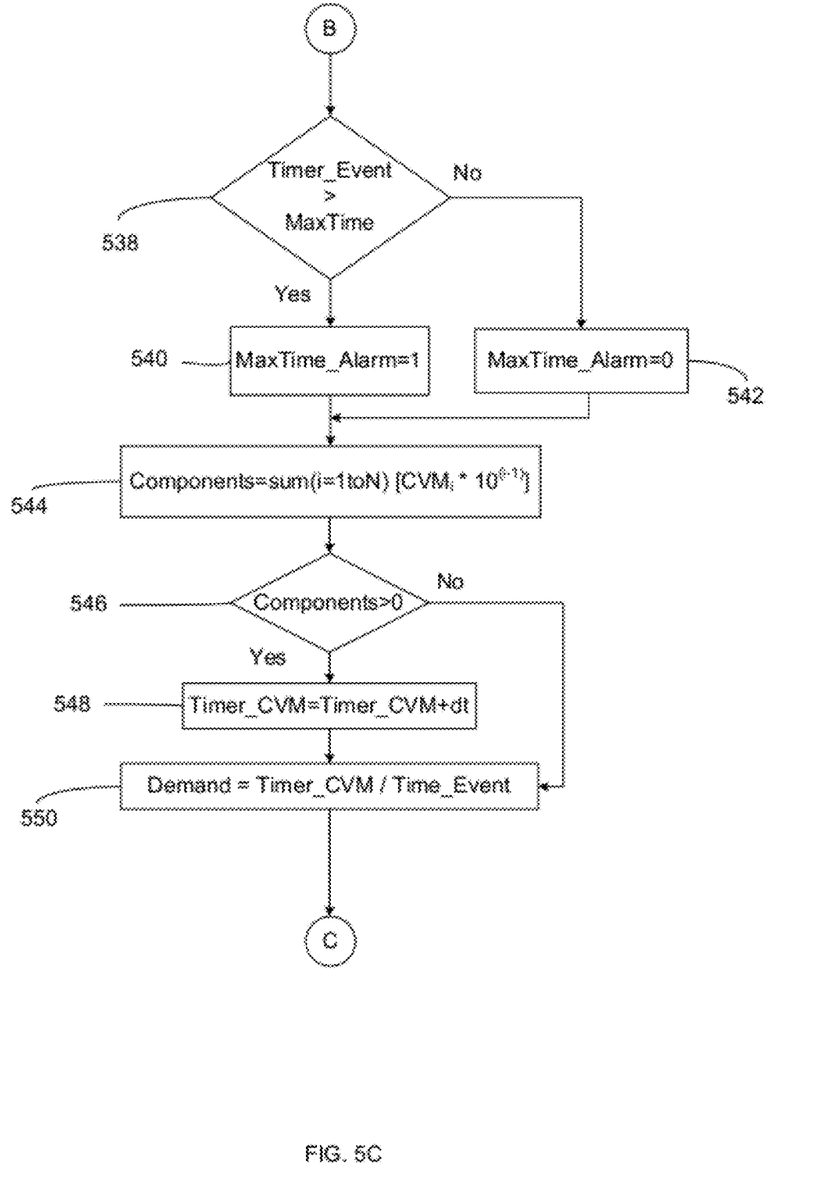

FIGS. 5A-5C illustrate a flow chart 500 describing process operations performed by controller 155 according to one embodiment of the present invention. The process operations begin in FIG. 5A at 502 where the central processor associated with controller 155 and software implementing portions of the various embodiments of the present invention are booted. At 504 variables associated with various calculations and diagnostics are initialized. In one embodiment, input variables are classified as measured variables, valve command variables (hydraulic fluid consuming device variables) and user-supplied variables. In one embodiment, the measured variables include Pnow. Valve commands may include CVM (i.e., consume or do not consume hydraulic fluid). User-supplied variables may include Pfloor, Preg, Ptrigger, MaxTime which indicates the maximum length of time for an event to occur, dt which is a time step for performing an integration, $\eta_{motor}$(Pelect) which is the efficiency of motor 115 and $\eta_{pump}$ which is the efficiency of pump unit 110.

In addition to input variables, there are a set of output variables that are initialized. In one embodiment, the output variables may be classified as dynamic output and output storage array of previous events that are stored on a hard drive or random access memory (RAM) of controller 155. The dynamic output variables may include valve demand, components associated with the valve demand, event number (event#), event timer variable for valve (Timer_CVM,) event timer variable for process (Timer_Event,) current volume of fluid (Vfluid) that is going to be integrated and a maximum time alarm (MaxTime_Alarm). The output storage array of previous event variables may include Vfluid, Timer_CVM, Timer_Event, Pmax (maximum power), Component and Demand.

As explained below with regard to the other steps of flow chart 500, other variables are used during the process to arrive at the calculated outputs. Some of these variables may include IntSW, Int_Reset, Pmax, and Pmech. Other variables may include IntSW_Old, L52_Old and Vfluid_Old. The details of these variables are explained below in more detail as they appear in the process operations described in FIGS. 5A-5C.

Those skilled in the art will recognize that the input variables, output variables, and the variables used to produce the outputs from the inputs are representative of one approach that may be used to program controller 155 to perform the aforementioned calculations and diagnostics. Other approaches are within the scope of the ability of artisans skilled in computer programming. The various embodiments of the present invention are not meant to be limited to any particular technique of programming controller 155 described herein.

Referring back to flow chart 500, the instantaneous power reading from wattmeter 150, Pnow, is evaluated and compared at 506 to a trigger power level Ptrig to determine if there is an event. This trigger may be provided by a user, or statistically established from the floor power Pfloor (e.g., its mean+3 standard deviations). If Pnow is greater than the trigger, Ptrig, either a flow event started or was already in process. As indicated in 508 the integrator switch variable IntSW is 1 for an event and 0 as shown at 510 if there is no event.

At 512 a decision is made to determine if an event has just begun. In particular, the decision at 512 includes determining if the integration switch IntSW_Old equals 0 and the current integration switch IntSW equals 1. If the old value of integrator switch (IntSW_Old) is 0 and the current value of integration switch IntSW is 1, then an event has just begun and requires initialization. Otherwise the initialization associated with process operations 514 and 516 are bypassed and flow chart 500 continues to program string A in FIG. 5B.

If controller 155 confirms that an event has begun at 512, then the integration reset variable Int_Reset is set to 1 and the integration old switch variable IntSW_Old is set to 1 at 514. Essentially, controller 155 is getting ready for the data processing operations associated with a new event. In particular, controller 155 gets ready for the data processing operations associated with the new event at 516 by preparing the start new event statistic variables. In one embodiment, preparing the start new event statistic variables includes setting Event# equal to Event#+1, setting Timer_CVM equal to 0, setting Timer_Event equal to 0 and setting Pmax equal to Ptrig.

Continuing onto program string A shown in FIG. 5B, controller 155 implements equation 9 at 518 to determine the net flow rate in excess of leakage, friction and windage. Next at 520, a decision is made as to whether the integration reset variable Int_Reset is equal to 0. Checking that the integration reset variable Int_Reset is equal to 0 ensures that controller 155 is considering a new event. If controller 155 determines at 520 that the integration reset variable Int_Reset is equal to 0, then it continues with integration of the flow rate at 522 to obtain the volumetric flow rate. On the other hand, if controller 155 determines at 520 that Int_Reset is not equal to 0, then it needs to set the fluid volume variable Vfluid_Old to 0 and the integration reset variable Int_Reset to 0 at 524.

At 526, controller 155 performs the integration of the flow rate to obtain the volumetric flow rate. In one embodiment, controller 155 may utilize a simple first-order Euler integration method to obtain the volumetric flow rate. Those skilled in the art will recognize that this is only one approach and that there are several other methods available to perform the integration.

At 528, controller 155 updates the old fluid volume variable Vfluid_Old by Vfluid to continue the integral in the next step, if required. In addition at 528, the timer associated with controller 155 is incremented by the time step dt.

Next a determination is made as to whether the power measurement obtained from wattmeter 150 has reached the maximum value Pmax in order to create an event statistic for the maximum power drawn. In particular, controller 155 determines at 530 if Pnow is greater than Pmax. If true, controller 155 sets Pmax equal to Pnow at 532. If false, the logic bypasses 532 and continues to another decision at 534. In particular, it is determined whether the integration switch variable IntSW equals 0 and the old integration switch variable IntSW_Old equals 1. Essentially, controller 155 is determining at 534 whether the sudden drop of Pnow to below Ptrig signals an end of an event. If it is determined to be false at 534 then the process operation bypasses processing block 536, and continues to programming string B. On the other hand, if it is true, all lagged variables such as IntSW_Old, Vfluid_Old and Int_Reset are reset to 0 at 536. In addition, all values for event variables such as Vfluid, Timer_Event, Timer_CVM, Pmax, Components and Demand are stored in memory or written to storage at 536.

Continuing onto program string B shown in FIG. 5C, controller 155 continues with the aspect of determining diagnostics for hydraulic pump unit 105 and hydraulic fluid consuming device 200. At 538, controller 155 is interested in determining whether the event has taken too long to end. For example, Pfloor may have risen above Ptrigger which is causing the delay in the event to end. Specifically, controller 155 determines at 538 whether the timer event variable Timer_Event is greater than the specified maximum time MaxTime. If the time has been exceeded, then an alarm variable is set to 1 at 540 in order to notify an operator. On the other hand, if the time has not been exceeded, then an alarm variable is maintained at a current state of 0 as indicated at 542 and the operator is not notified.

The process continues at 544 where controller 155 computes a valve state number for each hydraulic fluid consuming device 200 as indicated by their respective CVM value and sums up the valve state numbers for the Components. Essentially, controller 155 is keeping track of what the status was for all of the valves when they were on (i.e., CVM=1). Those skilled in the art will recognize that even though a base of 10 is shown in step 544 a base of 2 may be equally convenient for establishing a methodology to store CVM values. Also, note that if none of the valves (hydraulic fluid consuming devices 200) are on, then the Components number will be 0.

Once the Components value is computed, controller determines at 546 whether the Components value is greater than 0. If the Components values is greater than 0, then the timer variable Timer_CVM is set to Timer_CVM+dt at 548 in order to track the amount of time that the valve or valves demanded hydraulic fluid from hydraulic pump unit 105. This value forms the numerator of the variable Demand, which expresses the ratio of the time the valve(s) demanded fluid to the time that it took hydraulic pump unit 105 to complete the event. This Demand variable value is computed at 550. Note that this determination is also made if it is determined at 546 that the Components value is 0. Basically, this Demand variable value provides an indication if pump unit 110 was still running without any demands for fluid from a valve or valves.

Figure 6:
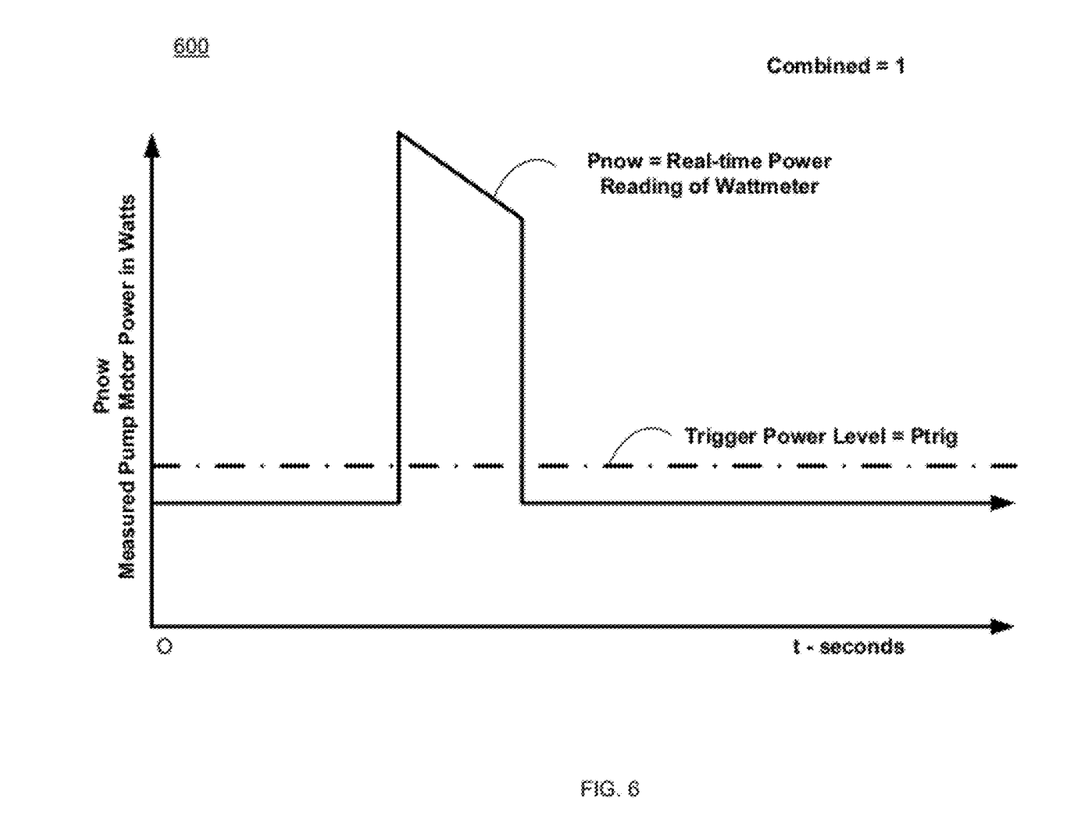
FIGS. 6-7 are examples of screen displays that may be presented to an operator while utilizing the controller according to one embodiment of the present invention.
Figure 7:
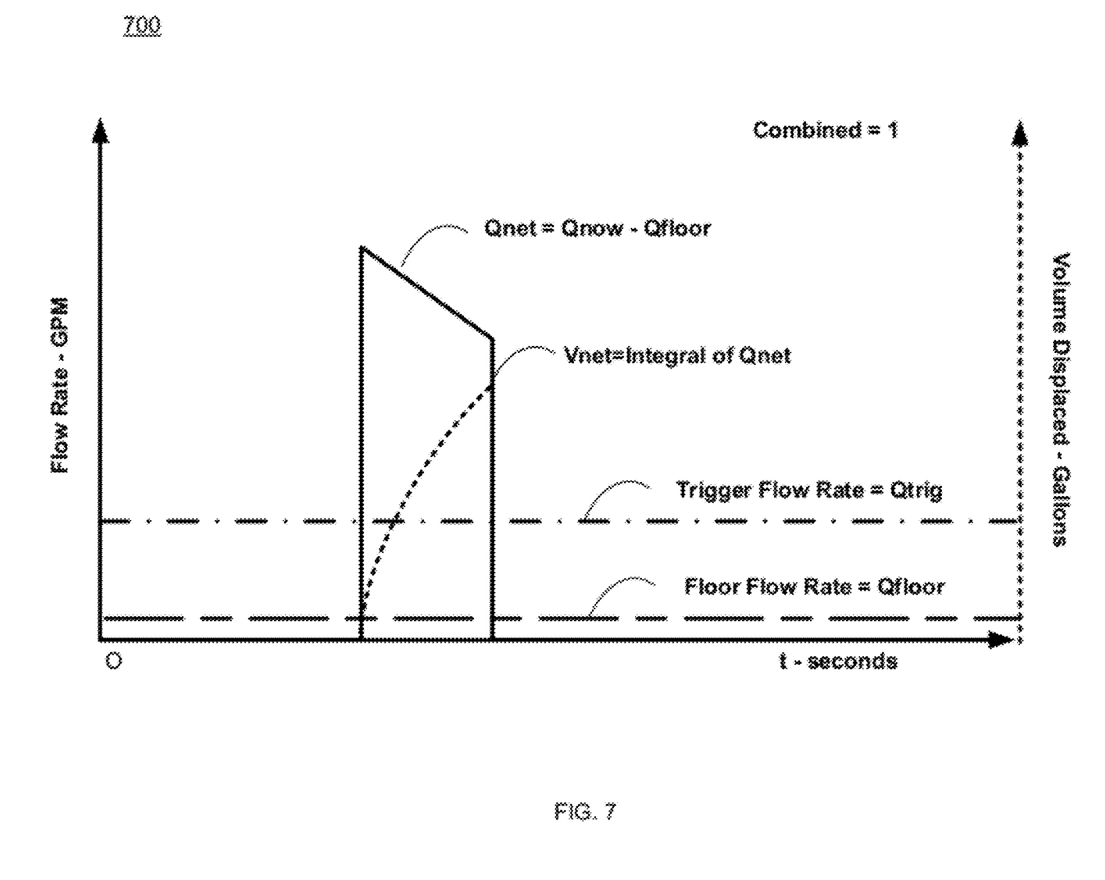

At this point, the various determinations made by controller 155 can be placed in storage and retrieved for subsequent analysis. For example, a plot of power and energy versus time can be obtained from the stored data and used by operators to understand the health of hydraulic pump unit 105 and hydraulic fluid consuming device 200. In one embodiment, the data captured during the event may be presented to an operator located at a remote computing system where controller 155 may be deployed or to an operator located proximate hydraulic pump unit 105 and hydraulic fluid consuming device 200 via a computing device such as a portable human interface machine. FIG. 6 shows a raw data power screen display 600 and FIG. 7 shows a post-processed volume rate and volume displaced screen display 700. Those skilled in the art will recognize that the screen displays of FIGS. 6-7 are only examples of what a possible display may look like and are not meant to limit the various embodiments of the present invention.

Both screen display 600 and screen display 700 show a variable Combined that may be utilized to indicate what is or what is not triggering an event. The following are four combinations of possible operations that may occur that could be captured in a screen shot such as the ones shown in FIGS. 6-7:

Combined is 0 and an event triggers. This could mean that even though no command was given to move a valve (hydraulic fluid consuming device 200), that a power surge occurred. This permits a diagnostic for a pump that may be failing. Due to contamination in the pressure control aspect of the pump, it is possible that the pump's pressure regulating apparatus may randomly surge. These non-commanded events could be stored by controller 155 and trended on a periodic basis to see if the pump is beginning to fail. Such events may occur more frequently and with greater power every time.

Combined is 1 and no event triggers. This means that a valve similar to 315 of FIG. 3 has opened to permit the hydraulic fluid to flow, but it did not happen. This would result in no power drawn and no volume displaced. The capture of such an event is advantageous in nearly every aspect of hydraulic systems, implying that despite controller 155 thinking that motion would occur, that the ram was actually at Xmax or jammed. This ability to sense a jam is positive feedback to a controller. For example, consider the case where landing gear on an aircraft may only have a sensor to indicate that a wheel is down and locked. If energizing the rams to lower the gear are stuck, this feature associated with captured Combined 1 with no triggers may be the only way to know for sure that the jam has occurred.

Combined is 1 and an event triggers. This is a normal occurrence for a cause and effect analysis.

Combined is 0 and no event triggers. This is a normal quiescent state where no hydraulic fluid is being demanded and the sampling may occur to establish Pfloor.

Those skilled in the art will recognize that the above scenarios are only examples of possible situations that may be captured and are not meant to limit the various embodiments of the present invention.

Referring back to FIGS. 5A-5C, because the process described in flow chart 500 is continuous, the process operation continues from process operation 550 to program string C which goes back to FIG. 5A at the portion after the booting of controller 155 and initialization of the various process variables.

The foregoing flow chart of FIGS. 5A-5C shows some of the processing functions associated with using controller 155 to compute various hydraulic fluid parameter computations and diagnostic. In this regard, each block represents a process act associated with performing these functions. It should also be noted that in some alternative implementations, the acts noted in the blocks may occur out of the order noted in the figures or, for example, may in fact be executed substantially concurrently or in the reverse order, depending upon the act involved. Also, one of ordinary skill in the art will recognize that additional blocks that describe the processing functions may be added.

In various embodiments of the present invention, portions of the actions performed by controller 155 can be implemented in the form of an entirely hardware embodiment, an entirely software embodiment or an embodiment containing both hardware and software elements. In one embodiment, the processing functions performed by controller 155 may be implemented in software, which includes but is not limited to firmware, resident software, microcode, etc. In one embodiment, the processing functions performed by controller 155 may be implemented in a control system such as the MARK™ VIe control system offered by GE Energy.

Furthermore, the processing functions performed by controller 155 can take the form of a computer program product accessible from a computer-usable or computer-readable medium providing program code for use by or in connection with a computer or any instruction execution system (e.g., processing units). For the purposes of this description, a computer-usable or computer readable medium can be any computer readable storage medium that can contain or store the program for use by or in connection with the computer or instruction execution system.

The computer readable medium can be an electronic, magnetic, optical, electromagnetic, infrared, or semiconductor system (or apparatus or device). Examples of a computer-readable medium include a semiconductor or solid state memory, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A system, comprising:
   a hydraulic fluid consuming device;
   a hydraulic pump unit that provides hydraulic fluid to the hydraulic fluid consuming device;
   a wattmeter that measures the electric power consumption by the hydraulic pump unit; and
   a controller that uses the electric power measured by the wattmeter to determine power delivered to the hydraulic fluid by the hydraulic pump unit and volumetric flow rate of the hydraulic fluid delivered to the hydraulic fluid consuming device by the hydraulic pump unit, wherein the controller determines the power delivered to the hydraulic fluid by the hydraulic pump unit by obtaining an electric power measurement from the wattmeter and comparing the electric power measurement to a predetermined minimum trigger threshold to ascertain a net power delivered to the hydraulic fluid by the hydraulic pump unit.

2. The system according to claim 1, wherein the hydraulic pump unit comprises a variable displacement, self-pressure regulated hydraulic pump.

3. The system according to claim 1, wherein the controller obtains a pump efficiency curve and a motor efficiency curve that are both associated with the hydraulic pump unit, the controller using the efficiency curves to determine the power delivered to the hydraulic fluid by the hydraulic pump unit and the volumetric flow rate of the hydraulic fluid delivered to the hydraulic fluid consuming device by the hydraulic pump unit.

4. The system according to claim 1, wherein the wattmeter is integrated with a motor protection system that is operatively coupled to the hydraulic pump unit.

5. The system according to claim 1, wherein the controller determines a plurality of diagnostics for the hydraulic fluid consuming device and the hydraulic pump unit during a steady-state operation, the plurality of diagnostics determined as a function of the power delivered to the hydraulic fluid and the volumetric flow rate of the hydraulic fluid delivered to the hydraulic fluid consuming device.

6. The system according to claim 5, wherein the plurality of diagnostics comprise determining when a flow of hydraulic fluid was demanded by the hydraulic fluid consuming device, determining an amount of time that the flow of hydraulic fluid was demanded by the hydraulic fluid consuming device, and determining an amount of hydraulic fluid that was supplied by the hydraulic pump unit to the hydraulic fluid consuming device.

7. The system according to claim 1, wherein the hydraulic fluid consuming device comprises at least one hydraulic cylinder that receives the hydraulic fluid from the hydraulic pump unit.

8. The system according to claim 1, wherein the controller is integrated with a portable human interface machine device that operates in proximity to the hydraulic pump unit and the hydraulic fluid consuming device.

9. The system according to claim 1, wherein the controller is integrated with a remote computing system that facilitates remote monitoring and diagnostics of the hydraulic pump unit and the hydraulic fluid consuming device.

10. The system according to claim 1, wherein the controller determines the volumetric flow rate of the hydraulic fluid delivered to the hydraulic fluid consuming device by the hydraulic pump unit by deducing the net flow rate of the hydraulic fluid from the net power and integrating the net flow rate to ascertain the volumetric flow displaced by the pump during an interval of time.

11. A hydraulic system, comprising:
   at least one hydraulic fluid consuming device;
   an electric motor;
   a pump unit driven by the electric motor that provides hydraulic fluid to the at least one hydraulic fluid consuming device;
   a valve that controls supply of the hydraulic fluid by the pump unit to the at least one hydraulic fluid consuming device;
   a wattmeter that measures the electric power consumption by the electric motor as the pump unit provides the hydraulic fluid to the at least one hydraulic fluid consuming device; and
   a controller that determines power delivered to the hydraulic fluid by the pump unit and volumetric flow rate of the hydraulic fluid delivered to the at least one hydraulic fluid consuming device by the pump unit as a function of the electric power measured by the wattmeter, wherein the controller determines the power delivered to the hydraulic fluid by the pump unit by obtaining an electric power measurement from the wattmeter, comparing the electric power measurement to a predetermined minimum trigger threshold to ascertain a net power delivered to the hydraulic fluid by the pump unit.

12. The hydraulic system according to claim 11, wherein the wattmeter is integrated with a motor protection system that is operatively coupled to the electric motor.

13. The hydraulic system according to claim 11, wherein the controller determines a plurality of diagnostics for the at least one hydraulic fluid consuming device, electric motor, pump unit, and valve during a steady-state operation, the plurality of diagnostics determined as a function of the power delivered to the hydraulic fluid and the volumetric flow rate of the hydraulic fluid.

14. The hydraulic system according to claim 13, wherein the plurality of diagnostics comprise determining when a flow of hydraulic fluid was demanded by the at least one hydraulic fluid consuming device, determining an amount of time that the flow of hydraulic fluid was demanded by the at least one hydraulic fluid consuming device, and determining an amount of hydraulic fluid that was supplied by the pump unit to the hydraulic fluid consuming device.

15. The hydraulic system according to claim 11, wherein the controller is configured to generate a plurality of plots displaying power and energy versus time.

16. The hydraulic system according to claim 11, wherein the controller determines the volumetric flow rate of the hydraulic fluid delivered to the at least one hydraulic fluid consuming device by the pump unit by deducing the net flow rate of the hydraulic fluid from the net power and integrating the net flow rate to ascertain the volumetric flow displaced by the pump during an interval of time.

17. The hydraulic system according to claim 11, wherein the controller is integrated with a portable human interface machine device that operates in proximity to the hydraulic pump unit and the hydraulic fluid consuming device.

18. The hydraulic system according to claim 11, wherein the controller is integrated with a remote computing system that facilitates remote monitoring and diagnostics of the pump unit and the hydraulic fluid consuming device.

* * * * *